(12) United States Patent
Ogawa

(10) Patent No.: US 11,836,944 B2
(45) Date of Patent: Dec. 5, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shuhei Ogawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 398 days.

(21) Appl. No.: 17/095,413

(22) Filed: Nov. 11, 2020

(65) Prior Publication Data

US 2021/0158566 A1 May 27, 2021

(30) Foreign Application Priority Data

Nov. 26, 2019 (JP) .................................. 2019-213738

(51) Int. Cl.
*G06V 40/10* (2022.01)
*G06T 7/73* (2017.01)
*G06N 20/00* (2019.01)
*G06F 18/213* (2023.01)
*G06V 10/77* (2022.01)
(Continued)

(52) U.S. Cl.
CPC .............. *G06T 7/74* (2017.01); *G06F 18/213* (2023.01); *G06N 20/00* (2019.01); *G06T 7/73* (2017.01); *G06V 10/454* (2022.01); *G06V 10/7715* (2022.01); *G06V 10/82* (2022.01); *G06V 40/10* (2022.01); *G06V 40/103* (2022.01); *G06T 2207/20081* (2013.01); *G06T 2207/30196* (2013.01)

(58) Field of Classification Search
CPC ... G06T 7/74; G06T 7/73; G06T 2207/20081; G06T 2207/30196; G06T 2207/20084; G06F 18/213; G06N 20/00; G06N 3/045; G06N 3/084; G06V 10/454; G06V 10/7715; G06V 10/82; G06V 40/10; G06V 40/103
See application file for complete search history.

(56) References Cited

FOREIGN PATENT DOCUMENTS

JP 2019185420 A 10/2019

OTHER PUBLICATIONS

Papandreou, George, et al. "Personlab: Person pose estimation and instance segmentation with a bottom-up, part-based, geometric embedding model." Proceedings of the European conference on computer vision (ECCV). 2018. (Year: 2018).*

(Continued)

*Primary Examiner* — Amandeep Saini
*Assistant Examiner* — Denise G Alfonso
(74) *Attorney, Agent, or Firm* — CANON U.S.A., INC. IP Division

(57) ABSTRACT

An apparatus that estimates a position of each object in image data in which a plurality of objects is imaged, the apparatus includes a first acquisition unit configured to acquire position information indicating positions of joints of the plurality of objects in the image data, a second acquisition unit configured to acquire a score map in which a feature for identifying each object is converted into a numerical value, the score map being output by a pre-trained model in response to input of the image data, and an identification unit configured to identify positions of joints belonging to each of the plurality of objects, based on the position information and the score map.

20 Claims, 16 Drawing Sheets

(51) Int. Cl.
*G06V 10/82* (2022.01)
*G06V 10/44* (2022.01)

(56) References Cited

OTHER PUBLICATIONS

Newell, Alejandro; Zhiao Huang; and Jia Deng; "Associative Embedding: End-to-End Learning for Joint Detection and Grouping." Advances in Neural Information Processing Systems; 2017; pp. 1-11.

* cited by examiner

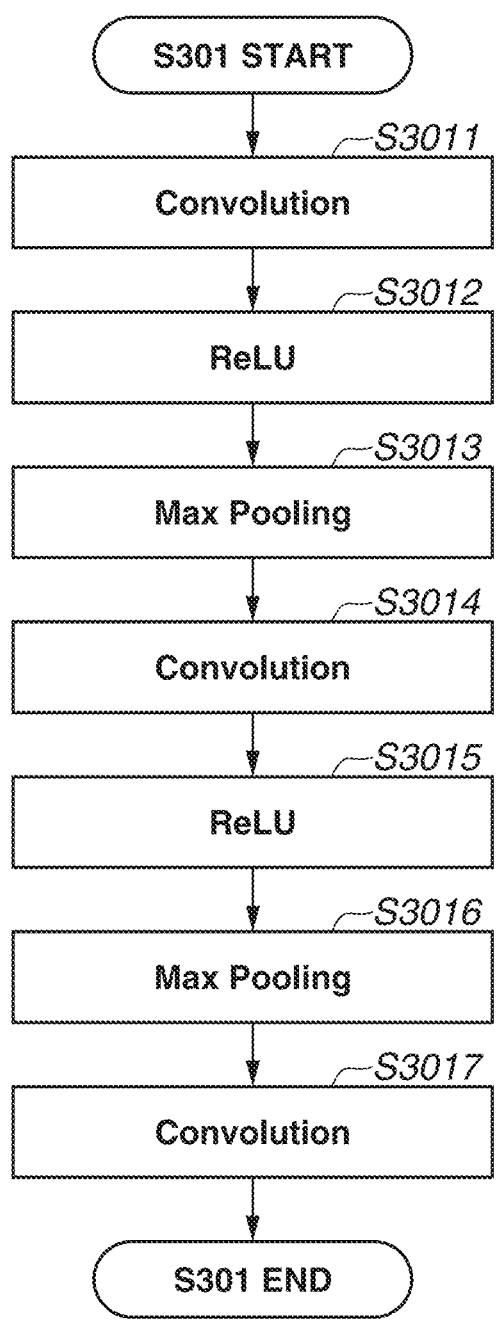

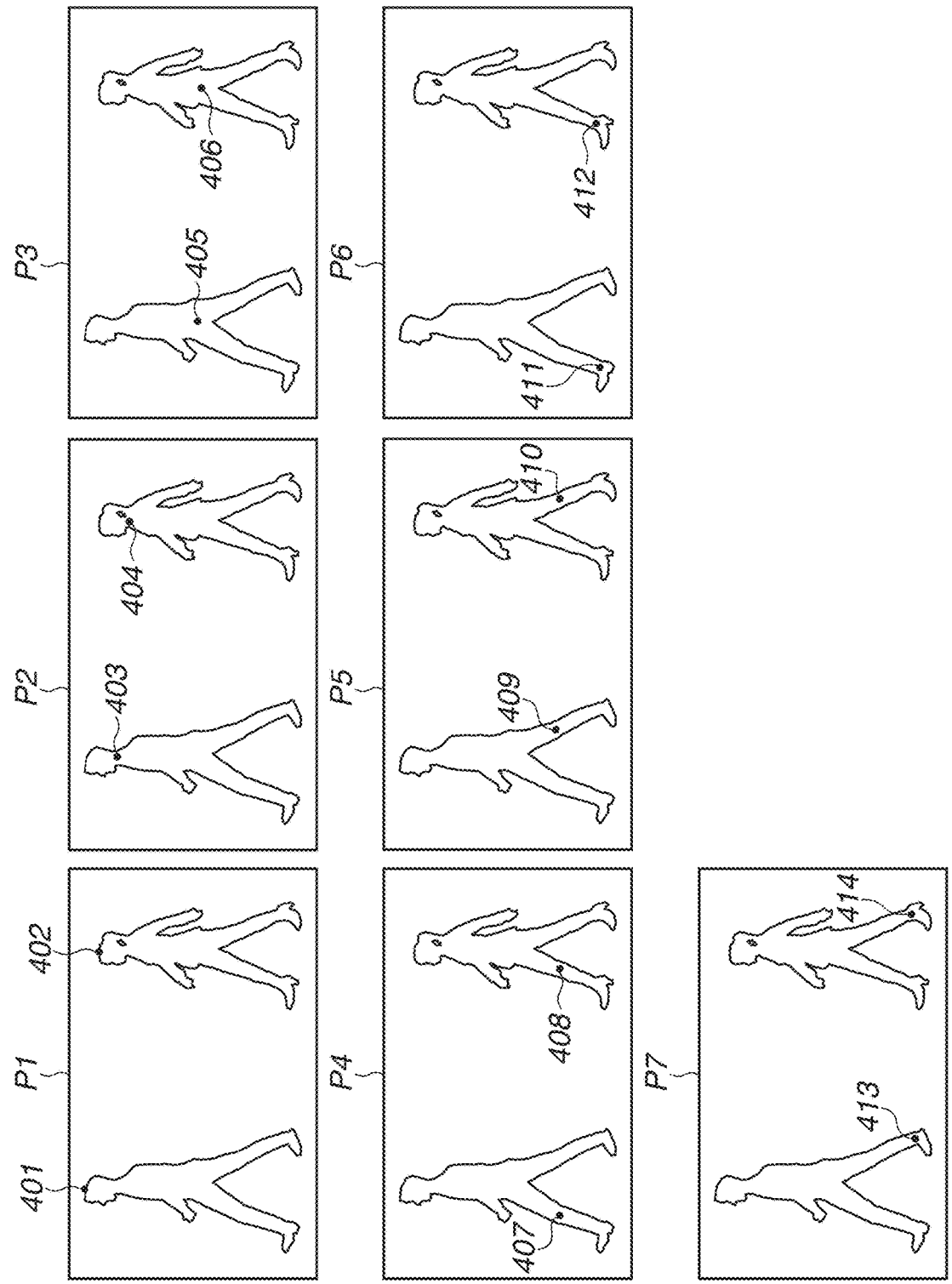

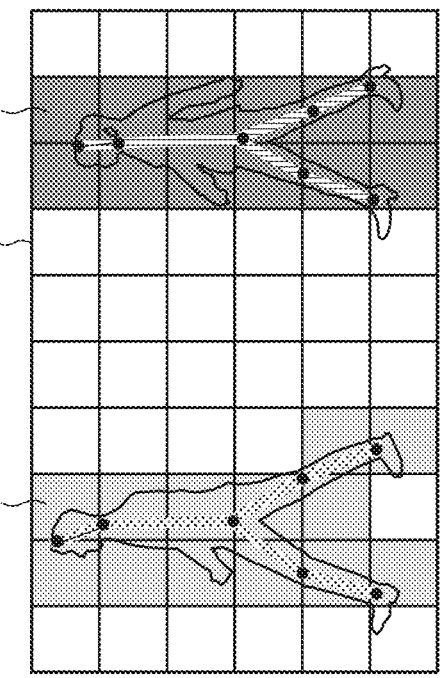
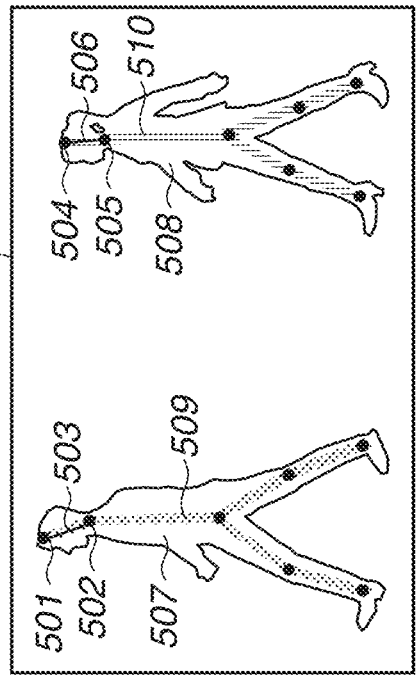
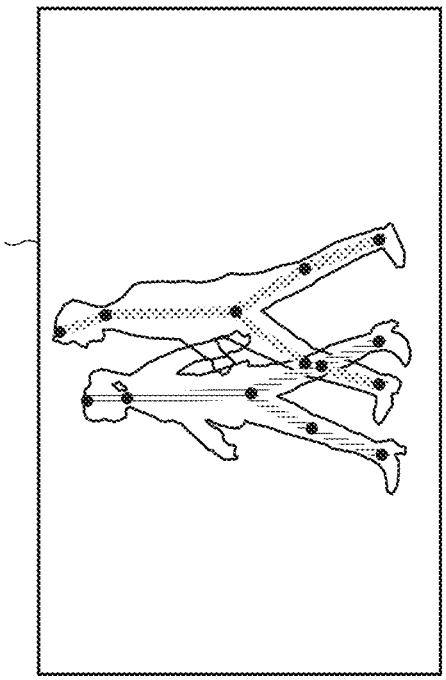
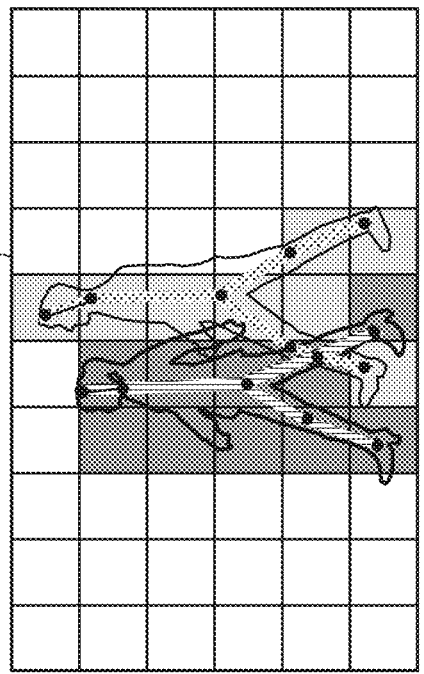

INFORMATION PROCESSING APPARATUS, INFORMATION PROCESSING METHOD, AND STORAGE MEDIUM

BACKGROUND OF THE DISCLOSURE

Field of the Disclosure

The aspect of the embodiments relates to a technique for identifying an object included in an image.

Description of the Related Art

In recent years, there have been a technique for analyzing an activity pattern of a person or a crowd from an image or video data acquired by a monitoring camera, and a technique for detecting a specific event from the image or video data to report the detected event. To implement such technique, a machine learning-based recognition technique is indispensable to recognize an attribute of an object, such as a person or car, a type of an action, such as walking or running, and a type (category) of an item on a person, such as a bag or basket, from moving image data captured by a monitoring camera. A deep neural network (DNN) has been attracting attention as a machine learning technique that implements highly precise recognition.

One of methods of recognizing a human figure included in an image is a method discussed by Alejandro Newell, Zhiao Huang, Jia Deng, "Associative Embedding End-to-End Learning for Joint Detection and Grouping, Neural Information Processing Systems". According to the method, a map indicating a joint position of a human figure is output, and information about attribution to which human figure in an image each of detected joints belongs is also output at the same time. In this process, a score specific to a human figure to which a joint belongs is estimated for each joint position, and therefore to which human figure a joint belongs can be estimated based on the score. For example, in a case where an image includes a plurality of neck parts and a plurality of head vertex parts, joints having close estimated scores are connected with each other, and therefore the posture of the head part of each human figure can be obtained. The above-described operation is performed for all the joints, and therefore each human figure posture in the image can be estimated.

DISCLOSURE

However, the method discussed by Newell has such an issue of misconnecting joints of different human figures in a case where an image includes a plurality of human figures adjacent to each other.

SUMMARY OF THE DISCLOSURE

According to an aspect of the embodiments, an apparatus that estimates a position of each object in image data in which a plurality of objects is imaged, the apparatus includes a first acquisition unit configured to acquire position information indicating positions of joints of the plurality of objects in the image data, a second acquisition unit configured to acquire a score map in which a feature for identifying each object is converted into a numerical value, the score map being output by a pre-trained model in response to input of the image data, and an identification unit configured to identify positions of joints belonging to each of the plurality of objects, based on the position information and the score map.

Further features of the disclosure will become apparent from the following description of exemplary embodiments with reference to the attached drawings.

BRIEF DESCRIPTION OF THE DRAWINGS

FIG. 5 is a flowchart illustrating processing in step S301.

FIG. 6 is a diagram illustrating an example of images each indicating a position of a joint for a corresponding part.

FIGS. 15A, 15B, 15C, and 15D are diagrams each illustrating an example of a score map.

DESCRIPTION OF THE EMBODIMENTS

Figure 1:
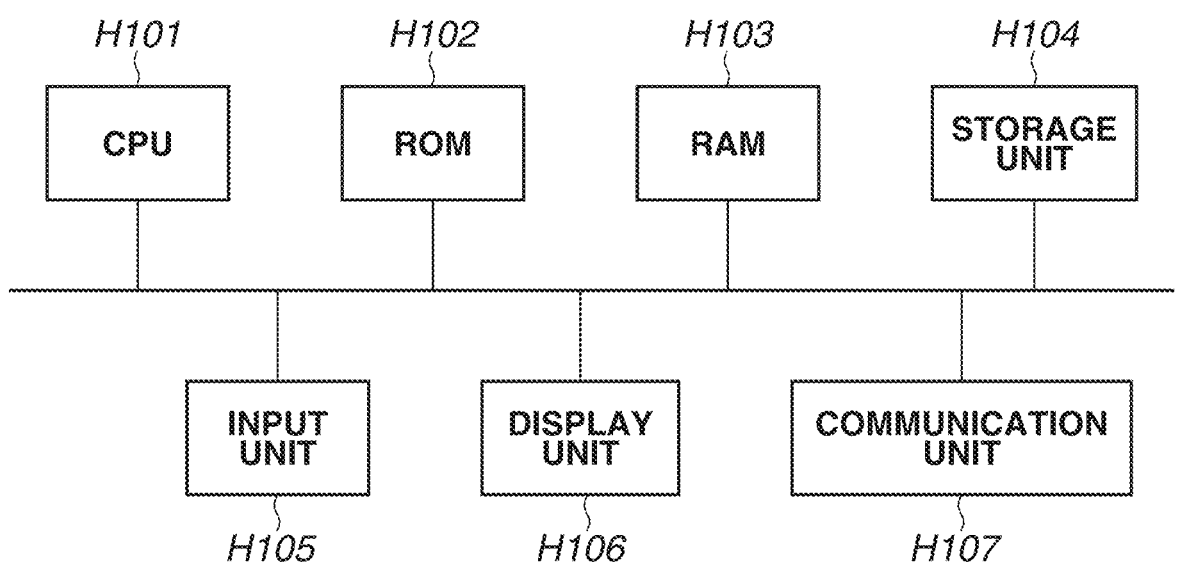
FIG. 1 is a diagram illustrating an example of a hardware configuration of an information processing apparatus.

An information processing apparatus according to each of exemplary embodiments of the disclosure will be described with reference to the drawings. Components indicated by the same reference numerals in the drawings operate in similar manners, and thus the redundant description thereof will be omitted. In addition, components described in each of the exemplary embodiments are only examples, and are not intended to limit the scope of the disclosure to these examples.

In a first exemplary embodiment, score inference is performed on a line connecting joints of a human figure. Since inference of score specific to a human figure to which joints belong is performed on a line connecting the joints, a score on a line connecting joints can also be referred to together with a score on a joint position that has been conventionally referred to as the only score. Therefore, even in a case where an inferred score on a joint position includes noise, different human figures can be distinguished from each other and recognized by referring to a plurality of scores on a line connecting joints. The above-described technique can be utilized in various environments such as nursing facilities, general houses, public facilities in places, for example, stations and urban areas, and shops including supermarkets and convenience stores. To implement this technique, identifying human figures from one another and precisely detecting an event occurring on each human figure are important. Examples of the event occurring on a human figure include a posture of a human figure.

In the present exemplary embodiment, a description will be given of an example case in which a joint position of a human figure is estimated for each part from an input image, and the posture of the human figure is estimated based on the estimated joint position. In the present exemplary embodiment, the types of the joint position to be estimated will be described as seven types that are a head vertex part, a neck part, a waist part, a right knee part, a left knee part, a right ankle part, and a left ankle part. The joint position to be estimated is not limited to these seven types, and may be increased or decreased as appropriate. For example, other types, such as right wrist part and left wrist part, may be added.

FIG. 1 is a hardware block diagram of an information processing apparatus 1 that estimates the posture of a human figure according to the present exemplary embodiment. A central processing unit (CPU) H101 controls the entire information processing apparatus 1 by executing a control program stored in a read only memory (ROM) H102. A random access memory (RAM) H103 temporarily stores various data from each component. Further, a program is loaded into the RAM H103, so that the program can be executed by the CPU H101.

A storage unit H104 stores processing target data according to the present exemplary embodiment, and estimation target data is saved therein. For a medium of the storage unit H104, a hard disk drive (HDD), a flash memory, or any of various optical media can be used. An input unit H105 includes a keyboard/touch panel, and receives an input from a user such as feedback information input in response to a posture estimation result. A display unit H106 includes a liquid crystal display or the like, and displays the posture estimation result for the user. The information processing apparatus 1 can communicate with other apparatuses, such as an imaging apparatus, via a communication unit H107.

<Execution Phase>

In the present exemplary embodiment, first, an execution phase using a pre-trained model will be described, and subsequently, a training phase of the pre-trained model will be described. In the execution phase, a description will be given of an example case in which processing for identifying an object in an image is performed using the pre-trained model that outputs a score map in which a position of each joint is associated with a score indicating an object to which the joint (a line connected to another joint) belongs. In the score map, scores varying among objects (large dispersion) even in a case where the objects are of the same type are calculated. The pre-trained model has been trained to output scores with large dispersion for joint positions belonging to different objects. Here, score inference is performed on a line connecting joints of a human figure using a score associated with a joint position. Then, processing of identifying a specific human figure from an image having a plurality of human figures will be described.

Figure 2:
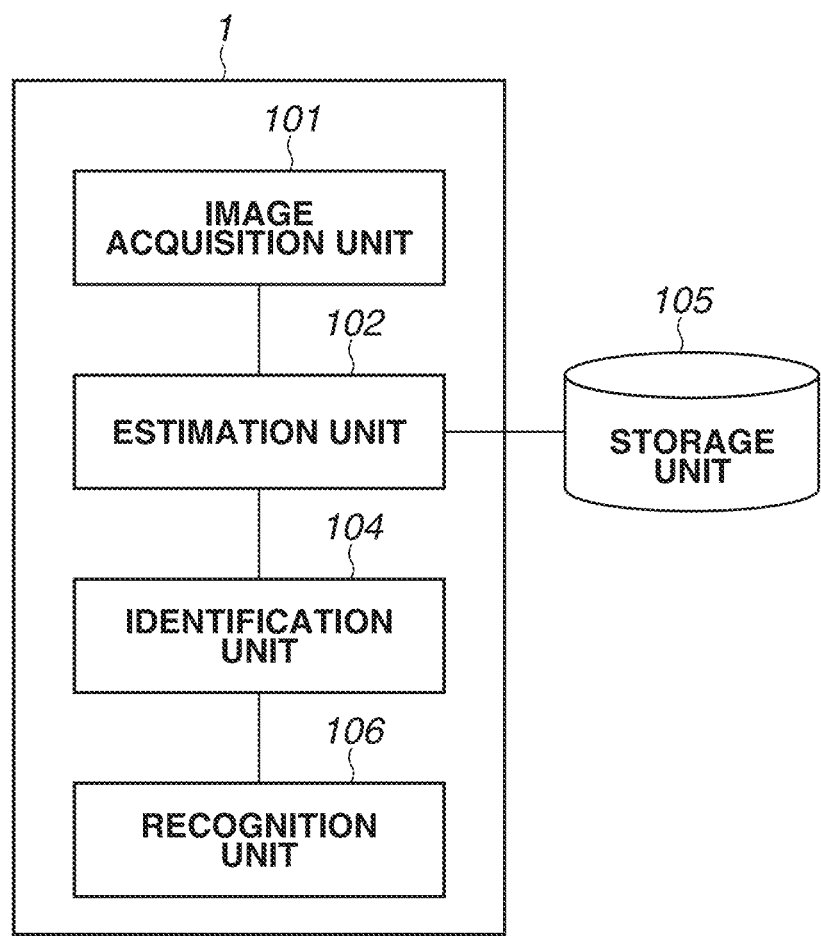
FIG. 2 is a block diagram illustrating an example of a functional configuration of the information processing apparatus according to the first exemplary embodiment.

FIG. 2 is a block diagram illustrating an example of a functional configuration of the information processing apparatus 1. Processing that is executed in the CPU H101 is illustrated as respective functional blocks. An image acquisition unit 101 acquires an image in which a human figure is imaged. The image acquisition unit 101 may acquire an image captured by an image capturing apparatus connected to the information processing apparatus 1, or may acquire an image stored in a storage unit 105. An estimation unit 102 estimates a joint position of a human figure included in the acquired image. The estimation unit 102 estimates a score map indicating predetermined values varying among human figures, for each area of the acquired image. A score estimation method will be described below. An identification unit 104 identifies a joint group indicating the same human figure, based on scores associated with the estimated joint positions in the estimated score map. One human figure is configured of a predetermined combination of joints, and thus a plurality of joint maps are integrated by identifying joints indicating close scores from the score map. Detailed processing thereof will be described below. A recognition unit 106 recognizes a posture of an object by connecting joint groups specified for the corresponding object. Patterns of the positional relationship between joints are stored in the storage unit 105 beforehand, and a posture of an object is recognized by matching between the positional relationship between the specified joint groups and the stored positional relationship between joints. a posture of an object may be estimated using a pre-trained model that estimates a posture of an object by receiving an input of the positional relationship between joints.

Figure 3:
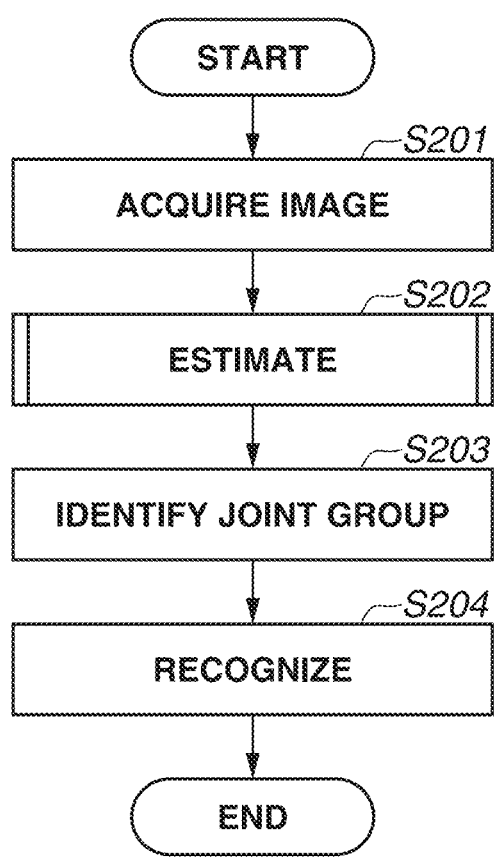
FIG. 3 is a flowchart illustrating a processing procedure that is executed by the information processing apparatus according to the first exemplary embodiment.

A description will be given of processing in the execution phase using the pre-trained model with reference to a flowchart in FIG. 3. The CPU H101, which is a computer, in FIG. 1 executes the processing illustrated in the flowchart in FIG. 3, based on a computer program stored in the storage unit H104.

A summary of the processing will be described. In step S201, the image acquisition unit 101 acquires an image including an object having a plurality of joints. In step S202, the estimation unit 102 estimates positions of joints for each type of joint from the image including the object having the plurality of joints. Subsequently, the estimation unit 102 acquires a score map for identifying a human figure included in the image, for each of the estimated joints. In step S203, the identification unit 104 identifies a joint group of the same individual from among a plurality of objects, based on the acquired score map of joints. In step S204, the recognition unit 106 recognizes a posture of each human figure based on the specified joint group.

In step S201, the image acquisition unit 101 acquires an image including an object having a plurality of joints. Here, for example, the object is a human figure, a plurality of human figures is included in the image, and one human figure is close to another human figure. In such an image, parts of human figures may intersect each other, or a certain human figure may be covered with a part of a different human figure, and thus it is difficult to determine to which human figure a joint belongs. As a matter of course, in a case where an image includes an object to be a recognition target, the image acquisition unit 101 acquires the image as a processing target.

In step S202, the estimation unit 102 detects positions of joints for each type of joint from the image including an object having the plurality of joints in response to inputting of the image acquired in step S201 into the pre-trained model. Further, the estimation unit 102 estimates a score map in which a likelihood indicating a position of the object to which those joints belong is included in each pixel or each area. For the score map, a score corresponding to a position of a joint belonging to an object and a score corresponding to a position of a joint belonging to another object are output, and these are different scores (likelihoods). In other words, the estimation unit 102 outputs a score map indicating scores that vary among objects (large dispersion) and correspond to the positions of a plurality of types of joint belonging to objects included in an input image, based on the pre-trained model. A detailed description will be given of the processing in step S202 performed by the estimation unit 102 with reference to a sub-flow in FIG. 4. In the present exemplary embodiment, the estimation unit 102 estimates a joint position of a human figure and a score thereof from an input image, based on a convolutional neural network (hereinafter, CNN) serving as the pre-trained model.

Figure 4:
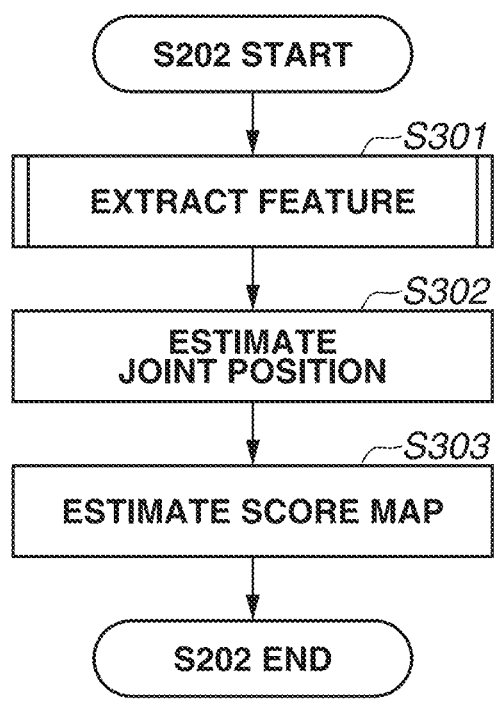
FIG. 4 is a flowchart illustrating a processing procedure that is executed by an estimation unit.

The processing in step S202 will be described with reference to FIG. 4. First, a processing procedure will be briefly described. In step S301, the estimation unit 102 extracts a feature by inputting an input image into the CNN serving as the pre-trained model. In step S302, the estimation unit 102 estimates a position of a joint of an object based on the feature extracted by the CNN. In step S303, the estimation unit 102 estimates a score map including a score enabling identification of each object, based on the feature extracted by the CNN.

Here, processing performed in step S301 by the CNN serving as the pre-trained model will be described with reference to FIG. 5. The CNN extracts a feature to be used for the estimation of a joint position and the estimation of a score map in the subsequent stages. The CNN includes convolution, and non-linear transformation, such as rectified linear unit (hereinafter abbreviated as ReLU) and max pooling. The ReLU and the max pooling described here are only examples. Leaky ReLU, sigmoid score function, or the like may be used in place of the ReLU, and average pooling or the like may be used in place of the max pooling. The present exemplary embodiment is not intended to limit these.

In step S3011, the input image is input into a convolution layer. Next, in step S3012, the non-linear transformation is performed by the ReLU. In step S3013, the max pooling is performed, and spatial-direction information is reduced. In step S3014 to step S3016, processing similar to step S3011 to step S3013 is performed. Finally, in step S3017, convolution processing is performed. A connection weighting coefficient of the CNN is stored in the storage unit 105 as a parameter set prepared beforehand. The CNN may be trained to extract a feature for detecting a joint position of an object and a feature for identifying an individual object included in an image. The parameter set before the training may be a set of random values. The above described configuration of the CNN is an example, and is not intended to limit the configuration of the CNN. A joint position of an object included in an image and a score map indicating to which object a joint belongs are estimated using the extracted feature. In order to separate the features for each type of estimation, the estimation unit 102 divides the output from the CNN into a channel for joint position estimation and a channel for score map estimation.

In step S302, the estimation unit 102 detects the position of each joint of the object included in the input image, based on the feature extracted from the input image. First, the channel for joint position estimation is input into a sigmoid function. This is a function for bringing a value having a range of [−∞, +∞] output by the CNN into a range of [0, 1], and is represented by the following expression (1-1).

$$\text{Sigmoid score}(x) = \frac{1}{1+e^{-x}} \quad (1\text{-}1)$$

Next, the estimation unit 102 inputs the channel for joint position estimation into a threshold processing unit, and detects a joint position for each type of joint. Among the input values, a value less than or equal to a predetermined threshold is zeroed as represented by the following expression (1-2).

$$\text{Thresholding}(x) = \begin{cases} 0 & \text{if } x \leq \text{threshold} \\ x & \text{else} \end{cases} \quad (1\text{-}2)$$

FIG. 6 illustrates a map indicating the joint position obtained in step S302. Seven joint maps corresponding to the seven types of joint, respectively, are obtained. Black points in the seven joint maps each indicate the joint position. Joint positions 401 and 402 each indicate an estimated head vertex part. Joint positions 403 and 404 each indicate an estimated neck part. Joint positions 405 and 406 each indicate an estimated waist part. Joint positions 407 and 408 each indicate an estimated right knee part. Joint positions 409 and 410 each indicate an estimated left knee part. Joint positions 411 and 412 each indicate an estimated right ankle part. Joint positions 413 and 414 each indicate an estimated left ankle part. The position of each joint is obtained by detecting a position having a value greater than zero in the seven maps.

The position of each joint is thus obtained. However, in the case of an image including a plurality of human figures, it is difficult to estimate the posture of each of the human figures in a case where it is unknown to which human figure each joint belongs. For example, in FIG. 6, determination of whether a neck part corresponding to the head vertex part indicated by the joint position 401 is the joint position 403 or the joint position 404. In a case where the number of human figures in the image is small and the human figures are sufficiently away from each other, it is relatively easy to estimate which joint and which joint are connected, by using a distance between the joints. However, in a case where human figures are near each other, it is difficult to connect joints appropriately. Therefore, processing for appropriately connecting joints and estimating a posture of a human figure will be described below.

In step S303, the estimation unit 102 estimates a score map including a score for identifying an individual object from the feature extracted by the CNN, using the pre-trained model. FIG. 15A illustrates an example of the estimated score map. A score map 1500 in FIG. 15A is an example in which the pixels (areas) of an input image are differently colored, using scores indicating which object is more likely to be present. For example, scores of the 100 s are associated with an area 15010, and scores of the 200 s are associated with an area 15011. In the score map 1500, different colors are used in accordance with the range of scores. For example, the areas 15010 and 15011 represent an example in which the ranges of the values of the estimated scores are differently colored. In other words, the score map 1500 indicates joint positions associated with close scores by using the same color for each area (or pixel). The channel about scores among the outputs obtained from the CNN is input to an identity function, so that the score map 1500 indicating scores for identifying an individual as illustrated in FIG. 15A is obtained.

In the present exemplary embodiment, joints can be appropriately connected by inferring a score of an object to which a joint belongs based on a score map. First, the identity function that is a function as represented by the following expression (1-3) directly outputs an input.

$$f(x)=x \qquad (1\text{-}3)$$

As will be described below for the training phase, the pre-trained model that is used in the present exemplary embodiment has been trained to indicate different scores for the positions of joints belonging to different objects. A score associated with each joint position is estimated to be embedded on a line connecting joints, and is different for each human figure included in an image. For example, joint positions 501 and 504 in FIG. 15B are estimated head vertex parts, joint positions 502 and 505 are estimated neck parts, and a line 503 and a line 506 are the estimated head vertex and neck part which is a combination of connectable joints. By referring to associated scores on the line connecting joints of the pair, the individual figure can be identified from one object to another. For example, values associated with the joint positions of the left human figure are different from values associated with the joint positions of the right human figure (associated values are discrete between figures), and therefore to which human figure a joint belongs can be recognized by referring to these values. This ends the processing in step S202 executed by the estimation unit 102. A training method for a model for estimating scores that enable identification of different objects in this processing will be described in detail below in the description of the training phase.

In step S203, the identification unit 104 identifies a joint group of the same individual among the plurality of objects, based on the estimated scores of joints. This will be specifically described with reference to FIGS. 15A and 15B and an expression (1-4). A score map 1501 illustrated in FIG. 15B is a map in which scores are associated with the joint positions of the head vertex part 501 to joint position 510, based on the estimated joint positions and the score map 1500 in FIG. 15A. Black points in the score map 1500 correspond to the joint positions in FIG. 15B. As a result of association of the scores, the joint positions 501 to 510 are associated with respective scores, which is values of the 100 s, for example, indicating the left human figure and values of the 200 s, for example, indicating the right human figure. Subsequently, for the joints, a combination of connectable joints is identified by referring to the scores.

Specifically, an evaluation score is calculated as indicated by the expression (1-4) to be solved using an output of a neural network. The expression (1-4) indicates an evaluation score in a case where a joint position i and a joint position i' are connected, and indicates that the smaller the evaluation score, the more it is likely that the joint position i and the joint position i' belong to the same human figure. Here, a line (i, i') indicates a set of pixel positions of a line connecting the joint position i' and the joint position i, and a score (x) indicates an estimated score at a position x. Such knowledge that a head vertex part and a neck part are connectable is determined beforehand as a rule, and an evaluation score is obtained using candidates (a pair of joints) that can be paired based on a rule for the types of joint and the positional relationship therebetween. A score on a line connecting a pair of joints is also included in the evaluation score.

$$\text{score}_{i,i'} = \frac{1}{|\text{Line}(i,i')|} \sum_{l \in \text{Line}(i,i')} |ID(i) - ID(l)| \qquad (1\text{-}4)$$

The above-described evaluation score is calculated between all the candidates of pairs of the joint positions i and the joint positions i'. The result of specifying a combination of connectable joints by referring to the evaluation score is a line connecting the joint positions in FIG. 15B.

FIGS. 15C and 15D illustrate score maps 1502 and 1503, respectively, as examples of a score map for human figures overlapping each other. For example, in a case where the left human figure is closer to a camera than the right human figure, there is a portion where a joint of the right human figure is hidden. In a stage in which training has sufficiently progressed, as illustrated in the score map 1503, the left and right human figures are identified from each other even in a case where these figures overlap one another, and different scores are associated with a front foot (a joint position of the front foot) of the right human figure and a rear foot (a joint position of the rear foot) of the left human figure, as the scores of the right human figure and the left human figure, respectively. The dispersion of the scores associated with the line connecting these two joints is large, and therefore these joints can be evaluated as joints not belonging to the same human figure. In this way, even in a case where there is an area where adjacent objects overlap one another, scores are associated with each line connecting joints, and therefore, it is possible to appropriately estimate to which object a joint belongs.

The identification unit 104 identifies the position of each object by specifying a joint belonging to each object based on a score estimated by a training model. In other words, joint positions associated with the lowest evaluation score among the evaluation scores calculated by substituting the score estimated by the training model into the expression (1-4) are estimated as joints belonging to the same object, and therefore a position of the individual object is identified. This will be described in more detail. For example, in the relationship between the head vertex parts 501 and 504 and the neck parts 502 and 505 in FIG. 15B, scores on the head vertex part 501 and the line 503 connecting the head vertex part 501 and the neck part 502 are identical, and thus the above-described evaluation score is small. Meanwhile, a score on a line connecting the head vertex part 501 and the neck part 505 has a value different from the score of the head vertex part 501, and thus the absolute value of the difference in the above-described evaluation score is large. Therefore, a neck part corresponding to the head vertex part 501 is estimated to be the neck part 502. Meanwhile, a score on a line connecting the head vertex part 504 and the neck part 502 is different from the score on the head vertex part 504, and thus the difference value in the above-described evaluation score is large. Further, scores on the line 506 connecting the head vertex part 504 and the neck part 505 are the same as the score on the head vertex part 504, and thus the difference value in the above-described evaluation score is small. Therefore, it is recognized that a neck part to be connected to the head vertex part 504 is the neck part 505. The above-described operation is performed for all the joints including the head vertex part to the neck part, the neck part to the waist part, the waist part to the knee part, and the knee part to the ankle part, so that the positions of the joints of each object are specified.

In step S204, the recognition unit 106 recognizes the posture of an object based on the specified joint group. In a case of recognizing the posture of a human figure, the posture is recognized from the positional relationship between joints of each human figure, using an existing technology. For example, a posture of a predetermined human FIG. may be recognized by inputting information about positions of joints of the predetermined human figure into a pre-trained model for recognizing a posture of a human figure. Further, a rule-based recognition is performed for recognizing an upright position or not by comparing data indicating a positional relationship between joints and a positional relationship between joints detected as joints belonging to a certain human figure. Furthermore, recognition processing which is performed in this procedure may be other than the posture recognition. For example, tracking or human-figure action detection may be performed. This ends the description of the execution phase.

<Training Phase>

Next, a description will be given of processing for generating a training model that outputs a score map including scores for identifying different objects onto a line connecting joints of objects in a case where an image including imaged objects is received. First, in order to identify a joint belonging to a certain object and a joint belonging to another object, a joint group corresponding to one object is identified based on position information in the image. Subsequently, based on a score map, the difference between a score corresponding to a joint group belonging to a certain object and a score corresponding to a joint group belonging to another object is obtained by performing a comparison therebetween. A loss function in a loss computing unit outputs a small loss value in a case where the difference is greater than or equal to a predetermined value, and outputs a large loss value in a case where the difference is smaller than a predetermined value. An output loss value decreases toward zero with increasing difference between scores. In a case where the determined loss value is greater than a predetermined value, training has not sufficiently progressed, and thus a parameter of a training model (an interlayer connection weighting coefficient of a training model) is updated. For scores in the same object, the loss function outputs a loss value in such a manner that a loss for a score is large in a case where the dispersion of scores corresponding to a joint group belonging to a certain object is greater than a predetermined value and a loss for a score is small in a case where the dispersion is smaller than or equal to a predetermined value. In a case where the determined loss value is greater than a predetermined value, training has not sufficiently progressed, and thus the parameter of the training model is updated. The training continues until the sum of these loss values output from the loss function becomes smaller than a predetermined value.

Figure 8:
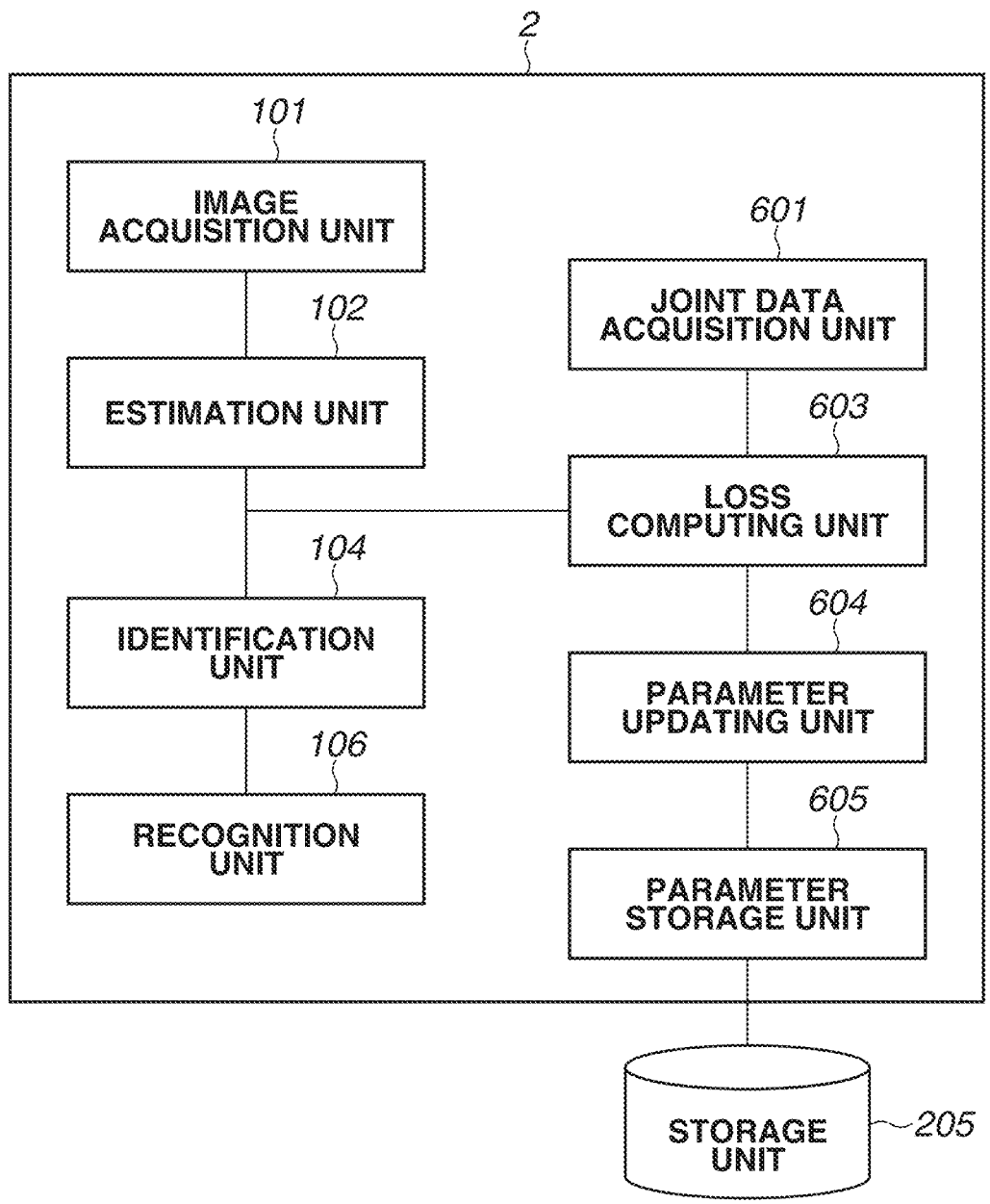
FIG. 8 is a block diagram illustrating an example of a functional configuration of an information processing apparatus in training.

Here, a method of training the position of each joint and a score for the joint will be described with reference to FIG. 8, for the pre-trained model that is used in the estimation unit 102. FIG. 8 illustrates an example of a functional configuration of an information processing apparatus 2 in training. The information processing apparatus 2 includes the image acquisition unit 101, the estimation unit 102, the identification unit 104, the recognition unit 106, a joint data acquisition unit 601, a loss computing unit 603, a parameter updating unit 604, a parameter storage unit 605, and a storage unit 205. The joint data acquisition unit 601 to the parameter storage unit 605 can be configured in an information processing apparatus for training separately from the information processing apparatus 2. Further, the storage unit 205 may be a functional configuration inside the information processing apparatus 2, or may be a storage device outside the information processing apparatus 2.

The image acquisition unit 101 acquires an input image to be used for training. A human figure is included in the image as a recognition target. The recognition target may be any object (e.g., an articulated robot and an animal) other than the human figure as long as the object has a plurality of parts. In the case of a human figure, a human figure can be divided into parts such as a head part, a neck part, and a torso part, and each of the parts can be divided by joints.

For the acquired image, the joint data acquisition unit 601 acquires joint data indicating a joint group belonging to each object and position information on image coordinates of a joint included in the image. In other words, the joint data acquisition unit 601 acquires ground truth (GT) data (here, joint position) corresponding to the image acquired by the image acquisition unit 101. Based on the joint data, a joint position in the image is acquired. Further, a joint group belonging to each object is identified. For example, the joint data is data illustrated in FIGS. 7A to 7D. Here, the GT data includes the position of a joint of a human figure in an image and a label for identifying a joint group belonging to each human figure. The GT data may be indicated by a line connecting joints of the same human figure based on connection between parts. Further, the joint data acquisition unit 601 generates a map having a peak at a joint position as illustrated in FIG. 6, for each type of joint, based on the joint position of the GT data. For example, in the case of a human figure, a map is generated for each of the joint positions that are a head vertex part, a neck part, a waist part, a right knee part, a left knee part, a right ankle part, and a left ankle part. The joint data may be data to which a label indicating a joint position and an object to which the joint belongs is assigned by a user. In the present exemplary embodiment, a combination of connectable joints is determined based on a rule will be described as an example. Joint data indicating a combination of connectable joints may be acquired using a pre-trained model that has been trained in the positional relationship between connectable joints. Training to be described below is mainly a training method for a score map indicating scores to be used for identification of an object.

The loss computing unit 603 substitutes an estimated score associated with a joint position into a loss function, based on a score map estimated by the estimation unit 102 (a training model in training) and the joint data (the GT data) indicating a joint position for each object. A loss value for the estimated score map is thus determined. The score map is a map associated with a score for identifying an individual object using a feature extracted to each pixel of the input image. There are two types of loss; one is a loss about a joint position, and the other is a loss about a score for determining to which human figure a joint belongs. A method of calculating the loss will be described below.

The parameter updating unit 604 updates a parameter of a training model (an interlayer connection weighting coefficient of a training model) for inferring a score to be used for identifying a human figure on a line connecting joints of a human figure. In a case where a loss value about a score estimated to identify a human figure is greater than a predetermined threshold or does not converge, the parameter is updated in such a manner that the loss value converges. In a case where the sum of loss values has converged or a loss value is smaller than a predetermined value, a parameter set is updated, and parameter updating to terminate the training will be described below.

The storage unit 205 stores the updated parameter set as a parameter of a pre-trained model.

Figure 9:
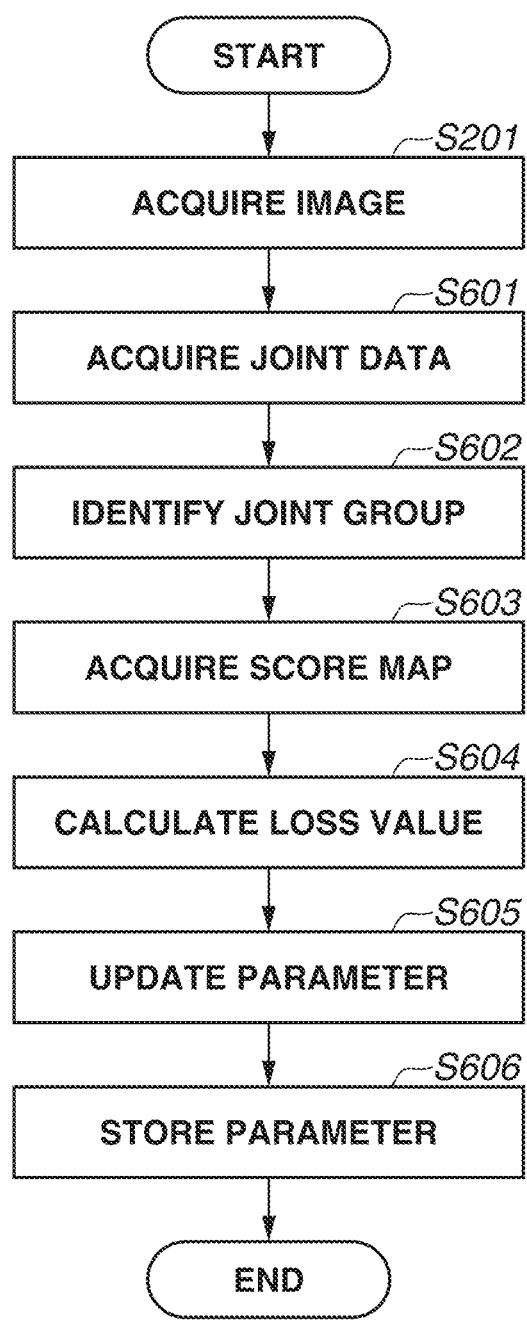
FIG. 9 is a flowchart illustrating a processing procedure that is executed by the information processing apparatus in training.

A processing procedure of training processing will be described with reference to FIG. 9. The CPU H101, which is a computer, in FIG. 1 executes the processing illustrated in the flowchart in FIG. 9, based on a computer program stored in the storage unit H104. However, the information processing apparatus 2 may not necessarily perform all steps to be described in this flowchart.

Figure 7A:
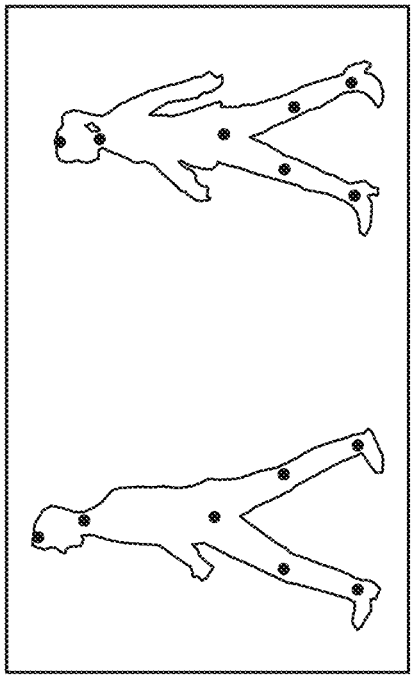
FIGS. 7A, 7B, 7C, and 7D are diagrams each illustrating an example of image data including position information indicating a position of a joint for each human figure.

In step S201, the image acquisition unit 101 acquires an input image. For example, an image illustrated in FIG. 7A is acquired.

Figure 7B:
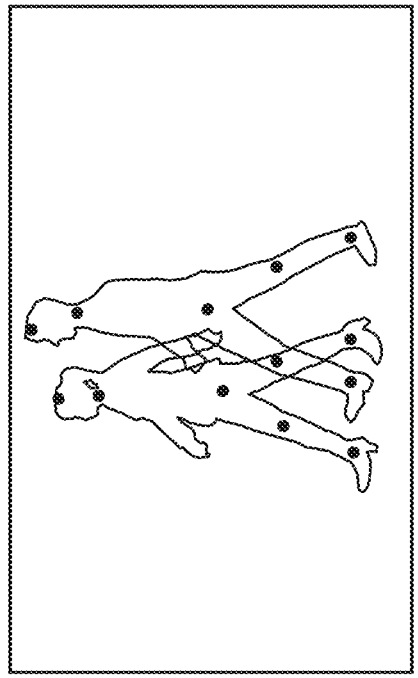
Figure 7C:
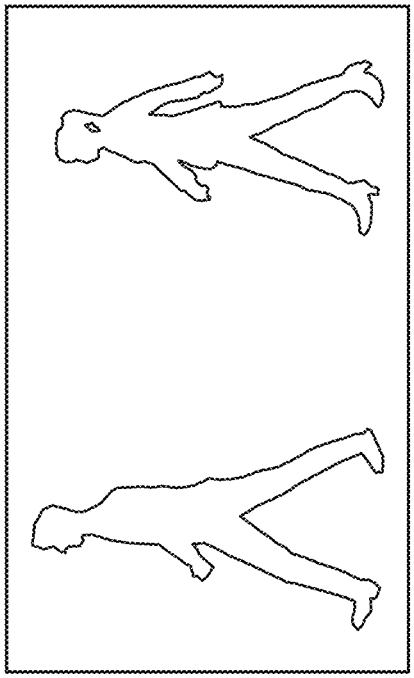
Figure 7D:
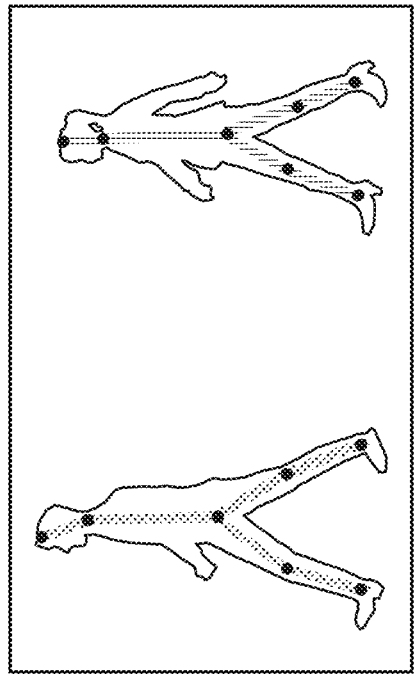

In step S601, the joint data acquisition unit 601 acquires joint data indicating a joint group belonging to each object and position information on image coordinates of a joint included in the acquired input image. Based on the joint data, a joint position in the image is acquired as illustrated in FIG. 7B. Further, as illustrated in FIG. 7C, GT data in which the joint position is assigned a label for individual identification is acquired for the acquired image. The left human figure and the right human figure are associated with different labels (e.g., 1 for the left human figure, and 0 for the right human figure). In FIG. 7C, a joint group for each human figure is illustrated by connecting joints of the same human figure with lines. In the case illustrated in FIG. 7D, for example, joint data indicating a joint position of a human figure at the front is prepared for an image in which human figures overlap each other. In this case, the knee part of the front foot of the right human figure is hidden, and the ankle part thereof is visible.

In step S602, the joint data acquisition unit 601 identifies a joint group belonging to each object, based on the joint data. In other words, the joint data acquisition unit 601 identifies a combination of connectable joints. For example, the joint data acquisition unit 601 identifies a combination of a joint corresponding to a head part and a joint corresponding to a neck part by referring to the joint positions of the same human figure. A line segment connecting the pair of joints conceptually corresponds to a bone of a human being. First, a GT map indicating a joint position is generated for each type of joint, based on the joint position of the GT data obtained from the joint data. A map having a peak (a black point used to display the vertex of a peak) at a joint position illustrated in FIG. 6 is generated for each type of joint. For example, a map P1 indicates a head vertex part, a map P2 indicates a neck part, a map P3 indicates a waist part, a map P4 indicates a right knee part, a map P5 indicates a left knee part, a map P6 indicates a right ankle part, and a map P7 indicates a left ankle part. A combination of joints is specified for each human figure. A connection relationship between joints established as illustrated in FIG. 7C is acquired from the joint data by this processing. The connection relationship between joints is established based on a rule set beforehand. For example, the rule is held in the storage unit as information about a positional relationship between joints (e.g., connecting in order of neck, waist, and foot). For the joint data and the information about the positional relationship between joints (collectively referred to as position information) described so far, data prepared beforehand by a user may be used, or data estimated using a different learning apparatus or a pre-trained model may be used.

In step S603, the estimation unit 102 acquires a score map in which a feature for identifying an object is converted into a numerical value for each pixel of the input image, by associating the position of a joint group belonging to each object with the input image acquired in step S201. Specifically, the estimation unit 102 inputs a channel about score among outputs obtained from a CNN into an identity function, to acquire a score map in which a joint position is assigned a score indicating to which human figure a joint belongs. While a score as a target to be calculated later using a loss function is a score for a joint position, the score may be acquired for each pixel. Here, score data indicating a score for identifying an individual about each detected joint is acquired by inputting the input image and the position information of the joint into the training model in training. The position information of the joint is not limited to being input into the same layer as the layer of the input image, and can be input into a middle layer. In a case where the training model has not yet been trained, a score that is random and insufficient to determine to which human figure a joint belongs is output.

In step S604, the loss computing unit 603 calculates a loss value for the estimated score map, based on the position of the joint group (the GT data) belonging to each object. First, a method of calculating the loss about the joint position will be described. The method of calculating the loss for the joint position is represented by an expression (1-5). Position$_{est}$ (j, i) represents the value of a position i in a map about a jth joint (1≤j≤J; here, J=7 because there are seven types of joint) of the estimated joint maps. GT (j, i) represents the value of a position i in a jth map of the joint maps assigned as GT. M represents the total number of pixels of the maps for the number of the inferred joints. The method of calculating the loss is not limited to a mean square squared error represented by the expression (1-5). Cross Entropy may be used as the loss.

$$\text{Loss}_{position} = \sqrt{\frac{1}{M}\sum_{j}\sum_{i}(\text{Position}_{est}(j, i) - GT(i, j))^2} \qquad (1\text{-}5)$$

Next, a method of calculating the loss about the estimated score map will be described. Using the loss function, the interlayer connection weighting coefficient of the training model is trained so that, for a score assigned to a joint position in a score map, the same or close values are output for joints of the same human figure and different values (large dispersion) are output for joints of different human figures. A loss about a score estimated to determine to which human figure a joint belongs is calculated by an expression (1-6). Here, N represents the number of human figures within the image, and score$_{est}$ (i) indicates the value of a position i in the estimated score map. Line$_p$ is a set of arbitrary points for each line connecting joints in a predetermined combination, for a pth (1≤p≤N; here, the number of human figures appearing in the image is N=2) human figure. Joints are connected in a certain order, and therefore, for example, a line connects adjacent joints in a case where joints are connected in order of head vertex, neck, waist, and foot. Further, α and β are hyper parameters empirically obtained. The expression (1-5) indicates that the loss is small in a case where the same scores are estimated on a line connecting joints of the same human figure and different scores are estimated for different human figures. Designing the loss in this way can infer the same scores for the same human figures and different scores for different human figures (scores with large dispersion). In addition, calculating the loss not only for the joint position but also for the line connecting joints increases the positions for which scores can be inferred, and more positions can be referred to during inferring, so that the robustness of score inference can be improved.

$$\text{Loss}_{id} = \qquad (1\text{-}6)$$
$$\alpha \frac{1}{N} \sum_{p} \sum_{i \in \text{Line}_p} \left( ID_{est}(i) - \overline{ID_p} \right)^2 + \beta \exp\left( -\frac{1}{N} \sum_{p} \left( \overline{ID_p} - \frac{1}{N} \sum_{k<N} \overline{ID_k} \right)^2 \right)$$

$$\overline{ID_p} = \frac{1}{|\text{Line}_p|} \sum_{i \in \text{Line}_p} ID_{est}(i) \qquad (1\text{-}7)$$

A loss to be eventually obtained is represented by the sum (an expression (1-8)) of the expression (1-6) and the expression (1-5). γ and θ are hyper parameters empirically obtained.

$$\text{Loss} = \gamma \text{Loss}_{position} + \theta \text{Loss}_{id} \qquad (1\text{-}8)$$

In step S605, in a case where the calculated loss value (or the sum of the loss values) is greater than a predetermined threshold, the parameter updating unit 604 updates the interlayer connection weighting coefficient (parameter) of the training model, based on the loss calculated by the expression (1-8). The parameter is updated based on a back propagation method, using momentum stochastic gradient descent (SGD) or the like. The output of the loss function for one image is described above, but in actual training, the loss value of the expression (1-8) is calculated for scores estimated for a plurality of various images. The interlayer connection weighting coefficient of the training model is updated in such a manner that the loss values for the plurality of images are all smaller than a predetermined threshold.

In step S605, the interlayer connection weighting coefficient of the training model updated in step S605 is stored in the parameter storage unit 605. The training model for inferring a score for identifying a human figure on a line connecting joints of a human figure is generated by performing the above-described processing. Since this training model is trained in consideration of connection between joints, and it is therefore easy to specify a joint group of the same human figure.

<First Modification>

A score is calculated by an expression (3-1), in place of the expression (1-4) in the first exemplary embodiment.

$$\text{score}_{i,i'} = |ID(i) - ID(i')| + |ID(i') - ID(k)| + |ID(k) - ID(i)| \qquad (3\text{-}1)$$

Here, k represents the coordinates of arbitrary one point on a line (i, i') connecting a joint position i and a joint position i'. The score can be quickly calculated by the expression (3-1), as compared with the expression (1-4).

<Second Modification>

In the present modification, a joint position and a human figure to which a joint belongs are estimated from an image, in a manner similar to the first exemplary embodiment. In the first exemplary embodiment, in order to determine a human figure to which a joint belongs, the score is determined based on the expression (1-4), based on the estimated score. In the present modification, a human figure to which a joint belongs is determined using the spatial positional relationship between joints, in addition to the estimated score. A loss function to be described here outputs a loss value based on the distance between a first object and a second object. Specifically, a score is calculated based on an expression (2-1). In the expression (2-1), $i_x$ and $i_y$ represent the x-coordinate and the y-coordinate of a joint i, respectively, and $i'_x$ and $i'_y$ represent the x-coordinate and the y-coordinate of a joint i', respectively. W score and $W_{position}$ are parameters empirically determined for each term. The expression (2-1) is formed by adding a term about the distance between joints to the expression (1-4). In other words, in a case where the positions of joints are close, the score is small (the likelihood of the same human increases), and in a case where the positions of joints are away from each other, the score is large (the likelihood of the same human decreases). This utilizes such a positional relationship between joints that, usually, the distance between joints of the same human figure is shorter than the distance between joints of different human figures. Calculating the score in this way results in large scores for joints of human figures spatially away from each other. Therefore, even in a case where the estimated scores are similar for two joints, it is difficult to determine that these joints belong to the same human figure, and thus the robustness improves.

$$\text{score}_{i,i'} = \qquad (2\text{-}1)$$
$$W_{id} \frac{1}{|\text{Line}(i, i')|} \sum_{l \in \text{Line}(i,i')} |ID(i) - ID(l)| + W_{pos} \sqrt{(i_x - i'_x)^2 + (i_y - i'_y)^2}$$

Further, in training, it is effective to calculate a loss while factoring the distance between joints in the calculation. The loss about the score in this case is represented by an expression (2-2).

$$\text{Loss}_{id} = \alpha \frac{1}{N} \sum_{p} \sum_{i \in \text{Line}_p} \left( ID_{est}(i) - \overline{ID_p} \right)^2 + \beta \exp \qquad (2\text{-}2)$$
$$\left( -\frac{1}{N} \sum_{p \neq k} \sqrt{(P_x(p) - P_x(k))^2 + (P_y(p) - P_y(k))^2} \left( \overline{ID_p} - \frac{1}{N} \sum_{k<N} \overline{ID_k} \right)^2 \right)$$

$P_x(p)$ and $P_y(p)$ represent the x-coordinate and the y-coordinate of a pth human figure, respectively, and are calculated by an expression (2-3), where $i_x$ and $i_y$ are the x-coordinate and the y-coordinate, respectively, of an ith joint.

$$P_x(p) = \frac{1}{|\text{Line}_p|} \sum_{i \in \text{Line}_p} i_x \qquad (2\text{-}3)$$
$$P_y(p) = \frac{1}{|\text{Line}_p|} \sum_{i \in \text{Line}_p} i_y$$

As indicated by the expression (2-2), since the distance between joints is also factored in the calculation of the loss, the scores of joints of different human figures close to each other are likely to have different values. Therefore, in the expression (2-1), when the score is calculated, even in case where the distance between joints is short, the difference between the values of the estimated scores is large, and therefore the score between joints of the same human figure is small and the score between joints of different human figures is large. As a result, a human figure to which a joint belongs can be estimated in a more robust manner.

In a second exemplary embodiment, there will be described an example in which the joint position estimation described in the first exemplary embodiment is applied to automatic robot picking from bulk components. A hardware configuration may be similar to that of the first exemplary embodiment illustrated in FIG. 1.

Figure 10:
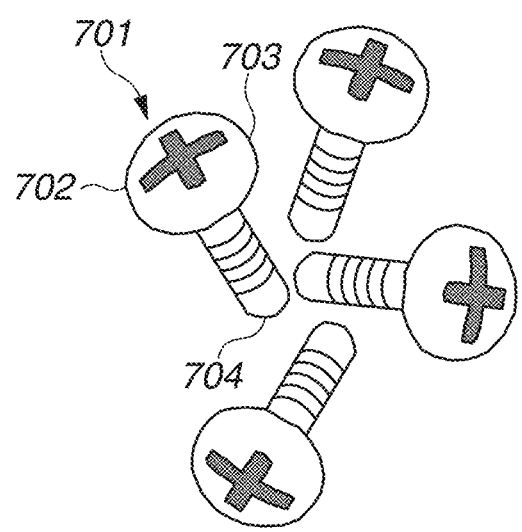
FIG. 10 is a diagram illustrating an example of an image of a target object.

In general, in the automatic robot picking from bulk components, it is important to recognize the posture of a component. For example, in order to hold a screw 701 illustrated in FIG. 10 with a robot arm, it may be desirable to hold appropriate portions such as portions 702 and 703 of the screw 701. In a case where the portion 702 and a portion 704 are held, there is a possibility that the screw 701 falls due to unstable holding.

Figure 11:
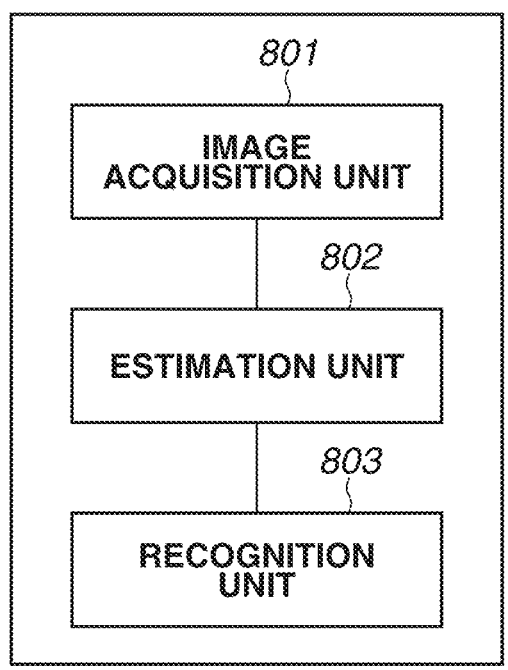
FIG. 11 is a block diagram illustrating an example of a functional configuration of an information processing apparatus according to a second exemplary embodiment.

In this way, in order to pick a component, it is important to examine a point (hereinafter referred to as "feature point") that enables the component to be easily held. Therefore, in the present exemplary embodiment, a method of applying the joint position estimation described in the first exemplary embodiment to the detection of a feature point of a component will be described. FIG. 11 illustrates a configuration of an information processing apparatus according to the present exemplary embodiment. The information processing apparatus according to the present exemplary embodiment includes an image acquisition unit 801, an estimation unit 802, and a recognition unit 803.

Figure 12:
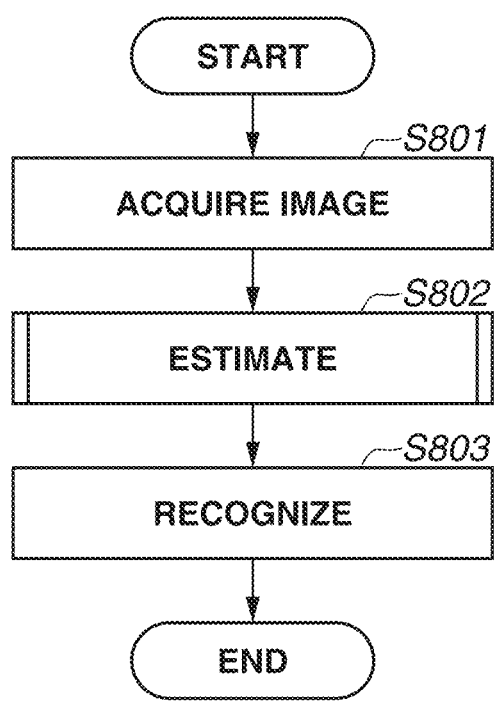
FIG. 12 is a flowchart illustrating a processing procedure that is executed by the information processing apparatus according to the second exemplary embodiment.

A processing procedure will be described with reference to a flowchart in FIG. 12. In step S801, the image acquisition unit 801 acquires an image including a component to be a picking target. The estimation unit 802 corresponds to the estimation unit 102 in FIG. 2 in the first exemplary embodiment. In step S802, the estimation unit 802 estimates the position of a feature point for holding the component and the score of the detected feature point. A method of detecting the feature point corresponds to the joint position estimation method of the first exemplary embodiment. The score of the feature point is estimated using a score map obtained by inputting the acquired image into a pre-trained model trained to embed identical scores on a line connecting different feature points within the same component. The details of a method of estimating the score map of the feature point are similar to those of the method of estimating the score map of the first exemplary embodiment. In step S803, the recognition unit 803 recognizes a component to which the feature point belongs, based on the score obtained by the estimation unit 802. The recognition unit 803 corresponds to the recognition unit 106 of the first exemplary embodiment.

In a third exemplary embodiment, there will be described an example in which the joint position estimation described in the first exemplary embodiment is applied to automatic video analysis of a sport scene. A hardware configuration may be similar to that of the first exemplary embodiment illustrated in FIG. 1.

In the automatic video analysis of sport scenes, in particular, ball games such as soccer, rugby, and basketball, which human figure is controlling a ball is important. The time during which each human figure controls a ball, the speed of a human figure in controlling a ball, and the timing when a human figure controlling a ball shoots or passes the ball are analyzed. This makes it possible to recognize information, e.g., about in what timing it is effective to shoot or pass the ball.

Figure 13:
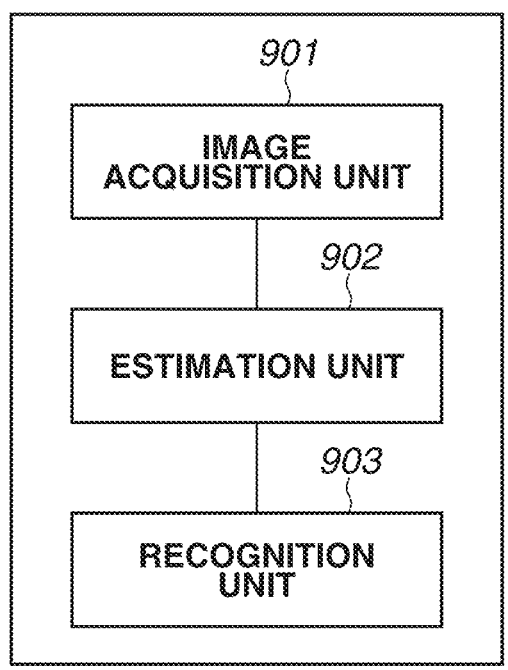
FIG. 13 is a block diagram illustrating an example of a functional configuration of an information processing apparatus according to a third exemplary embodiment.

In the present exemplary embodiment, a method of applying the joint position estimation described in the first exemplary embodiment to the estimation of a human figure controlling a ball will be described. FIG. 13 illustrates a configuration of an information processing apparatus according to the present exemplary embodiment. The information processing apparatus according to the present exemplary embodiment includes an image acquisition unit 901, an estimation unit 902, and a recognition unit 903.

Figure 14:
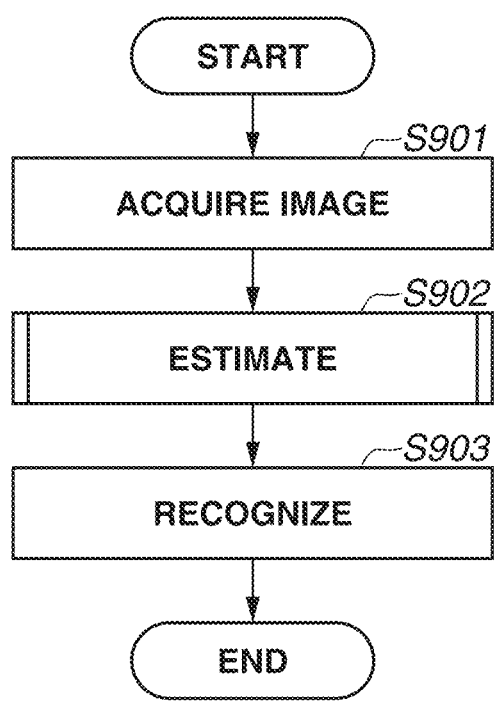
FIG. 14 is a flowchart illustrating a processing procedure that is executed by the information processing apparatus according to the third exemplary embodiment.
Figure 16:
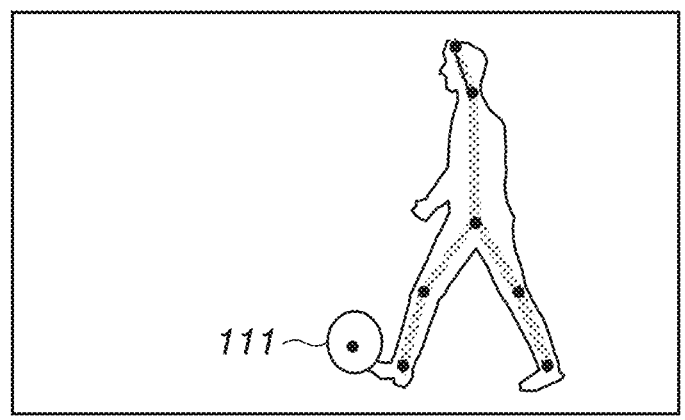
FIG. 16 is a diagram illustrating an example of image data including position information indicating a position of a joint for each object.

A processing procedure will be described with reference to a flowchart in FIG. 14. First, in step S901, the image acquisition unit 901 acquires a sport scene video to be an analysis target. The image acquisition unit 901 acquires, for example, an image in which a human figure and a ball are near each other to some extent, as illustrated in FIG. 16. The estimation unit 902 corresponds to the estimation unit 102 in FIG. 2 in the first exemplary embodiment. In step S902, the estimation unit 902 estimates the position of each of the human figure and the ball, and the score of each of the human figure and the ball, from the image. A method of estimating the position of each of the human figure and the ball is similar to the joint position estimation method of the first exemplary embodiment, and therefore a redundant description is omitted. Further, the estimation unit 902 estimates the score by using an estimation device trained to estimate identical scores on a line connecting a ball and a human figure. In step S903, the recognition unit 903 estimates a human figure controlling a ball, based on the score obtained by the estimation unit 902. The recognition unit 903 corresponds to the recognition unit 106 of the first exemplary embodiment. Here, for example, a human figure having a foot including a joint closest to the ball is recognized as the human figure controlling the ball.

Each of the exemplary embodiments is also implemented as follows. Software (a program) that implements a function of each of the above-described exemplary embodiments is supplied to a system or apparatus via a network for data communication or a storage medium. A computer (or a device such as a CPU or a micro processing unit (MPU)) of the system or apparatus reads out the program and executes processing based on the program. The program may be recorded in a computer-readable storage medium and read out from the storage medium.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-213738, filed Nov. 26, 2019, which is hereby incorporated by reference herein in its entirety.

What is claimed is:

1. An apparatus comprising:
one or more processors; and
one or more memories that store a computer-readable instruction configured to be executed by the one or more processors, thereby the computer-readable instruction causing the apparatus to:
acquire position information indicating positions of joints of a plurality of objects in image data;
acquire a score map in which a feature for identifying each of the plurality of objects is converted into a numerical value, the score map being output by a pre-trained model in response to input of the image data;
acquire, using the score map, a first evaluation score based on scores of a first joint at a first position, a second joint at a second position and a plurality of pixels between the first and second joints in the image data, and acquire, using the score map, a second evaluation score based on scores of the first joint at the first position, a third joint at a third position and a plurality of pixels between the first and third joints in the image data; and
determine which of the second joint and third joint belongs to an object to which the first joint belongs first and second evaluation scores.

2. The apparatus according to claim 1, wherein, for each of the plurality of objects, positions of joints are identified based on scores output to the positions of the joints indicated by the position information in the score map.

3. The apparatus according to claim 2, wherein, in the score map, in a case where dispersion of scores output to respective pixels on a line segment connecting a pair of joints determined based on types of the joints is less than a threshold, the pair of joints are identified as joints belonging to a same object, and in a case where the dispersion is more than or equal to the threshold, the pair of joints are identified as joints each belonging to a different object.

4. The apparatus according to claim 2, wherein, in the score map, in a case where a difference between scores output to positions of a pair of joints determined based on types of the joints is less than a threshold, the pair of joints are identified as joints belonging to a same object, and in a case where a difference between scores output to positions of a pair of joints is more than or equal to a predetermined threshold, the pair of joints are identified as joints each belonging to a different object.

5. The apparatus according to claim 1, wherein the pre-trained model is a model trained by updating an interlayer connection weighting coefficient of the model to decrease a loss value, by using a loss function that outputs the loss value which increases in a case where a difference between a score corresponding to a joint belonging to a first object and a score corresponding to a joint belonging to an object different from the first object is smaller than a predetermined threshold, the scores being output by the pre-trained model based on the position information.

6. The apparatus according to claim 1, wherein the pre-trained model is a model trained by updating an interlayer connection weighting coefficient of the model to decrease a loss value, by using a loss function that outputs the loss value which increases in a case where dispersion of scores corresponding to a joint group belonging to a same object is greater than a threshold, for the scores in the same object.

7. The apparatus according to claim 1, wherein the pre-trained model is a model trained by updating an interlayer connection weighting coefficient of the model to decrease a loss value, by using a loss function that outputs the loss value which increases with decrease in a distance between a first object and an object different from the first object, based on the distance.

8. The apparatus according to claim 1,
wherein, for each type of joints in the image data, the position information indicates positions of joints belonging to each of the plurality of object and a positional relationship between connectable joints of different types, and
wherein, for each of the plurality of objects, positions of joints are identified based on scores acquired from the score map for a pair of joints in a positional relationship of connectable joints that is determined based on the position information.

9. The apparatus according to claim 1, wherein a joint map indicating a position for each type of the joints are acquired.

10. The apparatus according to claim 1, further configured to recognize a posture of each object, based on the identified positions of joints belonging to each of the plurality of objects.

11. The apparatus according to claim 1, further configured to update a weighting parameter of the pre-trained model.

12. The apparatus according to claim 11, wherein an interlayer connection weighting coefficient of the model is updated to decrease a loss value, by using a loss function that outputs the loss value which increases in a case where a difference between a score corresponding to a joint belonging to a first object and a score corresponding to a joint belonging to an object different from the first object is smaller than a predetermined threshold, the scores being output by the pre-trained model based on the position information.

13. The apparatus according to claim 11, wherein an interlayer connection weighting coefficient of the model is updated to decrease a loss value, by using a loss function that outputs the loss value which increases in a case where dispersion of scores corresponding to a joint group belonging to a same object is greater than a threshold, for the scores in the same object.

14. The apparatus according to claim 11, wherein an interlayer connection weighting coefficient of the model is updated to decrease a loss value, by using a loss function that outputs the loss value which increases with decrease in a distance between a first object and an object different from the first object, based on the distance.

15. The apparatus according to claim 1, wherein positions of joints belonging to each of the plurality of objects in the image data are acquired, for each type of joint based on the pre-trained model.

16. A non-transitory computer-readable storage medium storing a program that causes a computer to execute a method comprising:
acquiring position information positions of joints of a plurality of objects in image data;
acquiring a score map in which a feature for identifying each of the plurality of objects is converted into a numerical value, the score map being output by a pre-trained model in response to input of the image data;
acquiring, using the score map, a first evaluation score based on scores of a first joint at a first position, a second joint at a second position and a plurality of pixels between the first and second joints in the image data, and acquire, using the score map, a second evaluation score based on scores of the first joint at the first position, a third joint at a third position and a plurality of pixels between the first and third joints in the image data; and
determining which of the second joint and third joint belongs to an object to which the first joint belongs, based on the first and second evaluation scores.

17. The non-transitory computer-readable storage medium according to claim 16, wherein identifying identifies positions of the joints belonging to each of the plurality of objects, based on a score output to the position of the joint indicated by the position information in the score map.

18. The non-transitory computer-readable storage medium according to claim 16, further comprising recognizing a posture of each object, based on the identified positions of joints belonging to each of the plurality of objects.

19. The non-transitory computer-readable storage medium according to claim 16, further comprising updating a weighting parameter of the pre-trained model.

20. A method comprising:
acquiring position information indicating positions of joints of a plurality of objects in image data;
acquiring a score map in which a feature for identifying each of the plurality of objects is converted into a numerical value, the score map being output by a pre-trained model in response to input of the image data;
acquiring, using the score map, a first evaluation score based on scores of a first joint at a first position, a second joint at a second position and a plurality of pixels between the first and second joints in the image data, and acquire, using the score map, a second evaluation score based on scores of the first joint at the first position, a third joint at a third position and a plurality of pixels between the first and third joints in the image data; and
determining which of the second joint and third joint belongs to an object to which the first joint belongs, based on the first and second evaluation scores.

\* \* \* \* \*